US009837825B2

(12) United States Patent
Chung et al.

(10) Patent No.: US 9,837,825 B2
(45) Date of Patent: Dec. 5, 2017

(54) TRANSMITTER FOR TRANSMITTING WIRELESS POWER (71) Applicants: INDUSTRY-UNIVERSITY COOPERATION FOUNDATION HANYANG UNIVERSITY, Seoul (KR); Chin-Wook Chung, Seoul (KR); Jin-Young Bang, Seoul (KR)

(72) Inventors: Chin-Wook Chung, Seoul (KR); Jin-Young Bang, Seoul (KR)

(73) Assignee: INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 398 days.

(21) Appl. No.: 14/386,764

(22) PCT Filed: Mar. 18, 2013

(86) PCT No.: PCT/KR2013/002161
§ 371 (c)(1),
(2) Date: Sep. 19, 2014

(87) PCT Pub. No.: WO2013/141533
PCT Pub. Date: Sep. 26, 2013

(65) Prior Publication Data
US 2015/0069851 A1 Mar. 12, 2015

(30) Foreign Application Priority Data
Mar. 20, 2012 (KR) .................. 10-2012-0028142

(51) Int. Cl.
H02J 5/00 (2016.01)
H04B 5/00 (2006.01)
H01F 38/14 (2006.01)

(52) U.S. Cl.
CPC .............. *H02J 5/005* (2013.01); *H01F 38/14* (2013.01); *H04B 5/0037* (2013.01); *H04B 5/0075* (2013.01)

(58) Field of Classification Search
CPC .. B60L 11/1829; B60L 11/1831; B60L 5/005; H02J 3/01; H02J 50/00–50/90;
(Continued)

(56) References Cited

U.S. PATENT DOCUMENTS

2005/0218814 A1* 10/2005 Gao ...................... G01N 21/68
315/62
2011/0175456 A1 7/2011 Kozakai

FOREIGN PATENT DOCUMENTS

KR 10-2011-0035196 A 4/2011

OTHER PUBLICATIONS

Sang-Youl Kim, "Design and mode analysis of cylindrical double resonant monopole antenna", master's thesis of jinju national university graduate school, Feb. 2009.
(Continued)

*Primary Examiner* — Daniel Kessie (57) ABSTRACT

A transmitter for transmitting wireless power and a wireless power transmitting system having the same in the present invention includes at least one helical or spiral type coil in which one end thereof is in a grounded state and the other end is in the air, wherein the coil wirelessly transmits the power by resonance. The present invention has simpler structure and operates with low frequencies as compared with the existing wireless power transmitting scheme using magnetic resonance, thereby to enhance the efficiency of the power transfer, to reduce the cost for system building, and to easily implement a transmitting section with the multi-channel.

7 Claims, 5 Drawing Sheets

(58) Field of Classification Search
CPC .......................... Y02T 90/122; H04B 5/0037; H04B 307/104; H01F 27/006; G06K 19/0723
See application file for complete search history.

(56) References Cited

OTHER PUBLICATIONS

Kwang-Soo Kim et al., "Impedance Properties for Solenoid Coil with a Cylindrical Ferrite Core", Journal of KIEE, Oct. 31, 2003, pp. 60-64.
International Search Report for PCT/KR2013/002161 filed on Mar. 18, 2013.

* cited by examiner

TRANSMITTER FOR TRANSMITTING WIRELESS POWER

TECHNICAL FIELD

The present invention relates to a transmitter for transmitting wireless power and a wireless power transmitting system having the same, and, in more particularly, to the transmitter for transmitting wireless power and wireless power transmitting system having the same including at least one helical type coil for transferring energy by resonance.

BACKGROUND ART

Miniaturization and portability for electronic products including home appliances in recent is quickly going on. In addition, the transmission for all information and signals is wirelessly processed and the lines to be connected to equipments disappear. The trial for wirelessly transmitting the power is performed in case of home appliances. In more detail, the wireless power transmitting using electromagnetic induction is used in an electric toothbrush, etc., but there are problems in that the transmitting efficiency is too lowered, even when the distance is slightly increased, and unnecessary and dangerous heat generation are caused.

On the other hand, a recent studying non-radiative energy transmitting technology, that is, an electromagnetic resonant wireless power transmitting scheme may acquire high transmitting efficiency even at the distance of many meters as compared with the existing electromagnetic induction scheme. This technology is based on attenuation waves coupling for moving electromagnetic waves from one medium to another medium through local area electromagnetic fields on resonating two media as the same frequencies from each other, and therefore the energy is transferred only when the resonant frequencies between two media are the same, and the unused energy is reabsorbed into electromagnetic fields. Therefore, the electromagnetic waves are harmless to peripheral machines or humans differently with different electromagnetic waves.

Figure 1:
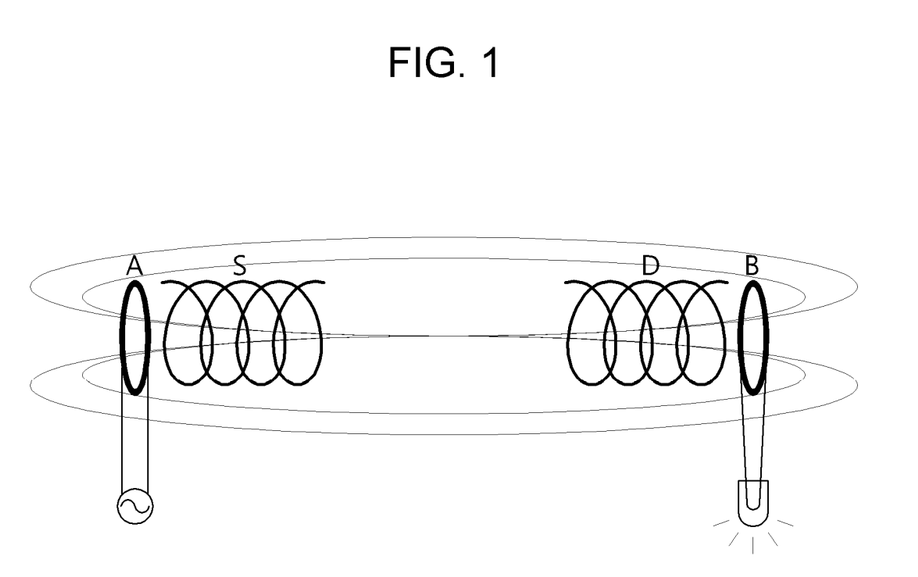
FIG. 1 schematically shows a wireless power transmitting system according to a prior art.

FIG. 1 schematically shows a wireless power transmitting system according to a prior art. As shown FIG. 1, a electromagnetic resonant wireless power transmitting scheme according to a prior art includes a power supply section A, a transmitting resonant coil S for receiving the power by inductive coupling with the power supply section A, a receiving resonant coil D for receiving the power by magnetic resonance with the transmitting resonant coil S, and a load end B for finally receiving the power by inductive coupling with the receiving resonant coil D.

The transmission having high efficiency is possible in the electromagnetic resonant wireless power transmitting system according to the prior art when the resonance frequencies between the transmitting resonant coil and receiving resonant coil should be correctly coincided from each other. In addition, the impedance matching between the transmitting coil and receiving coil is necessary at the transmitting frequencies, and therefore the distances between the transmitting coil and power supply and the receiving coil and load end should be suitably controlled according to the transmitting distance.

In order to solve those problems, Korean Unexamined Patent Application Publication No. 2011-0062841 has proposed a wireless power transmitting apparatus including at least one power relay coil to wirelessly transmit the power to a plurality of electronic equipments positioned at a long distance.

However, the wireless power transmitting scheme using a prior magnetic resonance has a limiting item in that the power supply section and the transmitting resonance coil must transfer the power in an inductive coupling type.

The wireless power transmitting scheme using the magnetic resonance according to the prior art has problems in that the resonant frequencies may be affected by an antenna of the power supply section and mutual inductance of the transmitting coil.

Further, there is a limit for a long distance transmitting, a variable RF impedance matching circuit separately needs according to the distance from the load impedance, and there is a difficulty for implementing the transmitting section with multi-channel. The wireless power transmitting scheme using the magnetic resonance according to the prior art has to include the power supply section for each transmitting section so as to implement the transmitting section with multi-channel, thereby to increase the manufacturing cost of the system.

DISCLOSURE

Technical Problem

An advantage of some aspects of the invention is that it provides a transmitter for transmitting wireless power and a wireless power transmitting system having the same for wirelessly transmitting the power using helical resonance of helical coils.

Another advantage of some aspects of the invention is that it provides a transmitter for transmitting wireless power and a wireless power transmitting system having the same that may easily implement the transmitting section with multi-channel by connecting a plurality of helical coils.

Further another advantage of some aspects of the invention is that it provides a transmitter for transmitting wireless power and a wireless power transmitting system having the same, including the helical coils, that may autonomously implement an impedance matching circuit.

Technical Solution

According to an aspect of the invention, there is provided a transmitter for transmitting wireless power including at least one helical or spiral type coil, in which one end thereof is in a grounded state and the other end is in the air, wherein the coil wirelessly transmits the power by resonance.

Wherein, the power having the same frequencies as those of ¼ or an integer multiple thereof of the length of the coil is applied to the helical coil from a power supply section and therefore the coil resonates.

As above, the transmitter for transmitting wireless power including the helical type coil that may wirelessly transmit the power by resonance is used, thereby to have simple structure and to operate with low frequencies, to enhance the efficiency of the power transfer, and to reduce the cost for system building.

The power supply section is connected to a tap formed at a winding section of the coil, applies the power to the coil, and may autonomously form an impedance circuit into the coil by varying a position of the tap.

An impedance seen from the power supply section is the square, of the ratio of the number of the turn for the coil having the tap to the number of the entire turn for the coil having the tap, multiplied by the impedance at a load end.

A trimming capacitor or an inductor on the coil is connected in parallel with the power supply section.

The coil is formed in multiple, one end of the coils is grounded to a common line, and the other ends of them are in the air. Therefore, a transmission section may easily have multi-channel and therefore it is possible to wirelessly transmit the power in various ways.

The power supply section is connected to one coil only among the plurality of the coils to apply the power, and the coils that are not connected to the power supply section among the plurality of the coils receive electrical energy from the coil connected to the power supply section by the resonance of the coil connected to the power supply section.

Wherein, the plurality of coils has the same lengths.

The coils contain ferrite core to control resonance frequencies.

On the other hand, a wireless power transmitting system in the present invention includes a power supply section for generating power; a transmitter for receiving the power generated from the power supply section; a receiver for wirelessly receiving the power by magnetic resonance with the transmitter; and a load end for wirelessly receiving the power from the receiver by inductive coupling with the receiver, wherein the transmitter includes at least one helical or spiral type coil, in which one end thereof is in a grounded state and the other ends thereof are in the air, for wirelessly transmitting by resonance.

When resonance frequencies are varied due to variation of the distance between the transmitter and receiver, impedance matching is performed by changing the frequencies of the power supply section into varied resonance frequencies.

Advantageous Effects

As described above, a transmitter for transmitting wireless power and a wireless power transmitting system having the same according to the present invention wirelessly transmits the power using the helical resonance of a plurality of helical coils, and therefore the inductive coupling between the power supply section and the transmitter is not need.

The present invention transmits the power using the helical resonance of the helical coils, thereby to lower the driving frequencies, to reduce the power emitted to the air, and to enhance power transmitting efficiency.

The present invention may easily implement the transmitting section with multi-channel by connecting a plurality of coils, and may implement the transmitting section with the multi-channel despite using one power supply section, thereby to save the cost for building the wireless power transmitting system.

The present invention controls the position of the tap for applying the power to the helical coils and therefore may autonomously implement the impedance matching circuit to the helical coils.

BEST MODE

Hereinafter, an exemplary embodiment of the disclosure will be described in detail with reference to drawings. However, the disclosure cannot be limited to the embodiment in which the idea of the disclosure is presented, another embodiment included within range of idea of another backward disclosure or the closure may be easily proposed by addition, change, deletion and the like of another constituent.

Hereinafter, embodiments of the present invention will be described in detail with reference to the accompanying drawings. However, the present invention is not limited to the embodiments. Like reference numerals refer to like elements.

Figure 2:
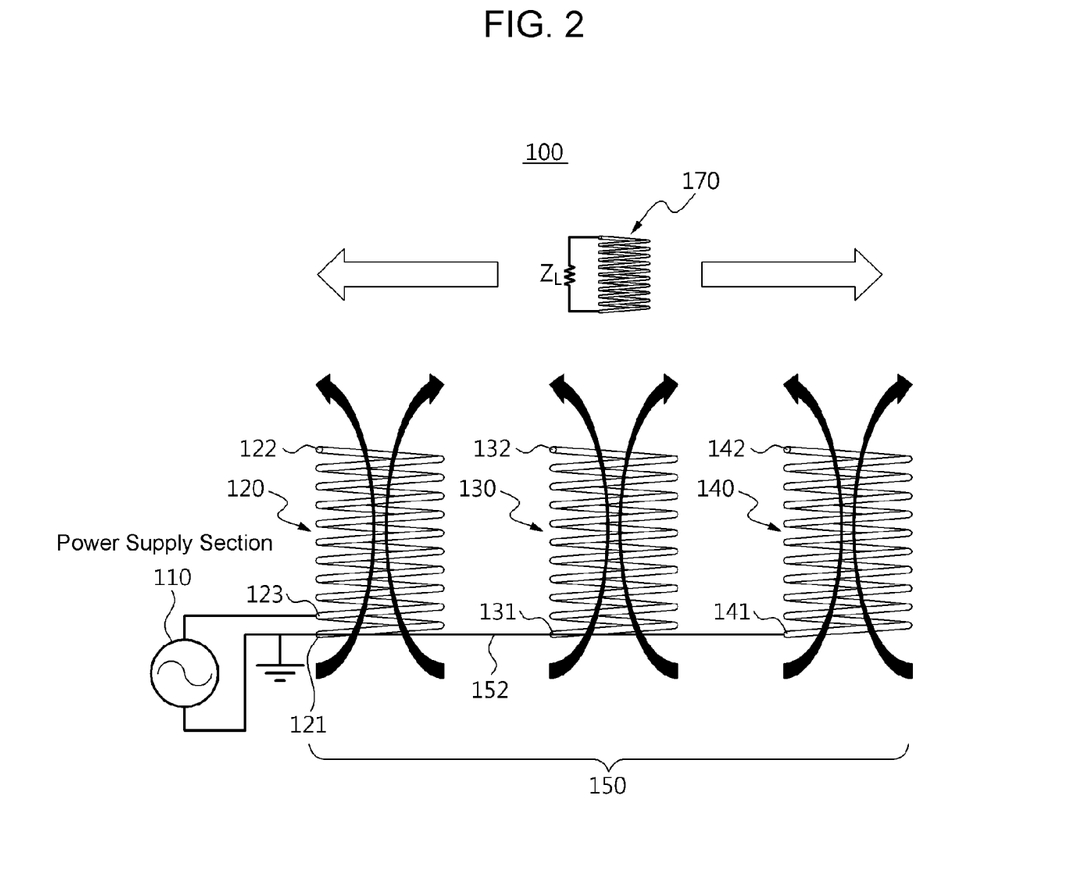
FIG. 2 shows the wireless power transmitting system and a transmitter according to an exemplary embodiment of the present invention.
Figure 3:
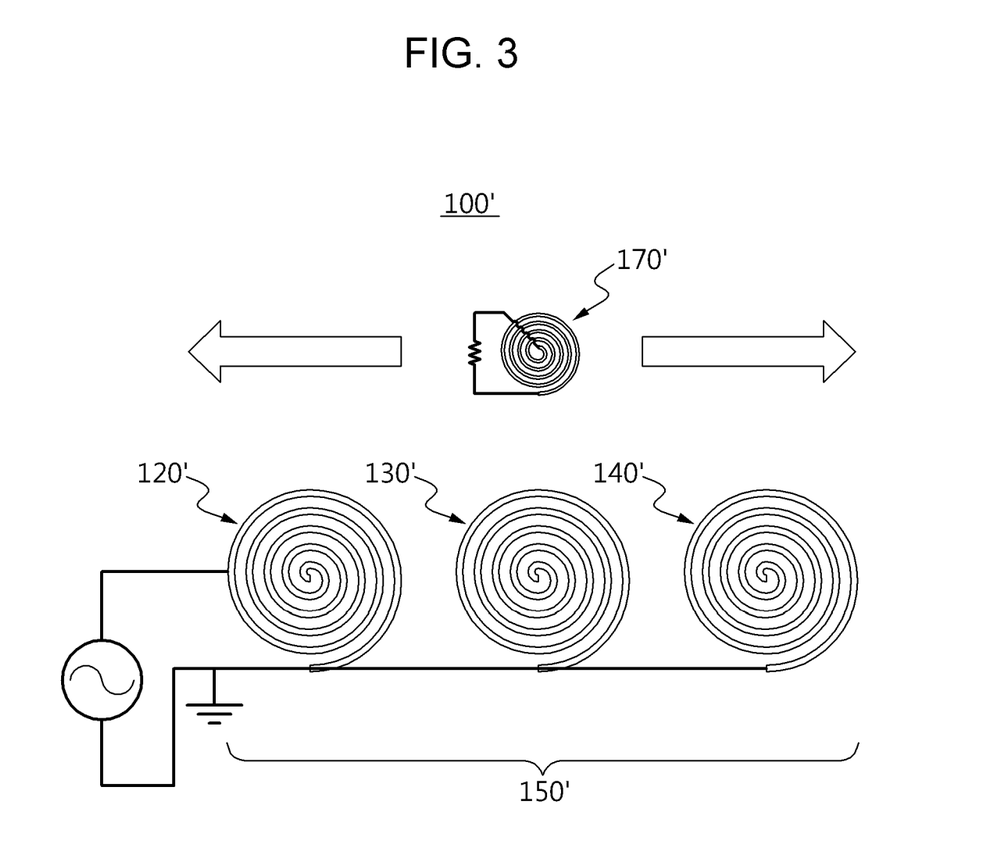
FIG. 3 shows the wireless power transmitting system and transmitter according to another embodiment of the present invention.
Figure 4:
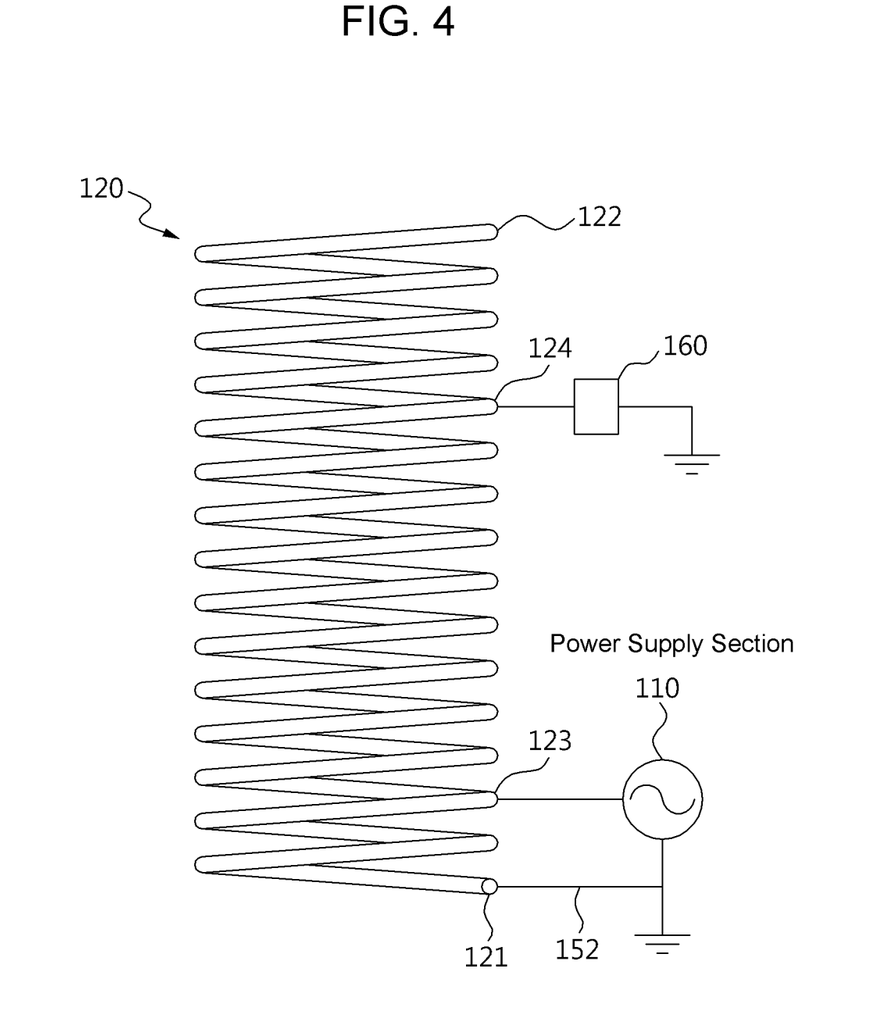
FIG. 4 shows a transforming example for the transmitter for transmitting wireless power according to an exemplary embodiment of the present invention.
Figure 5:
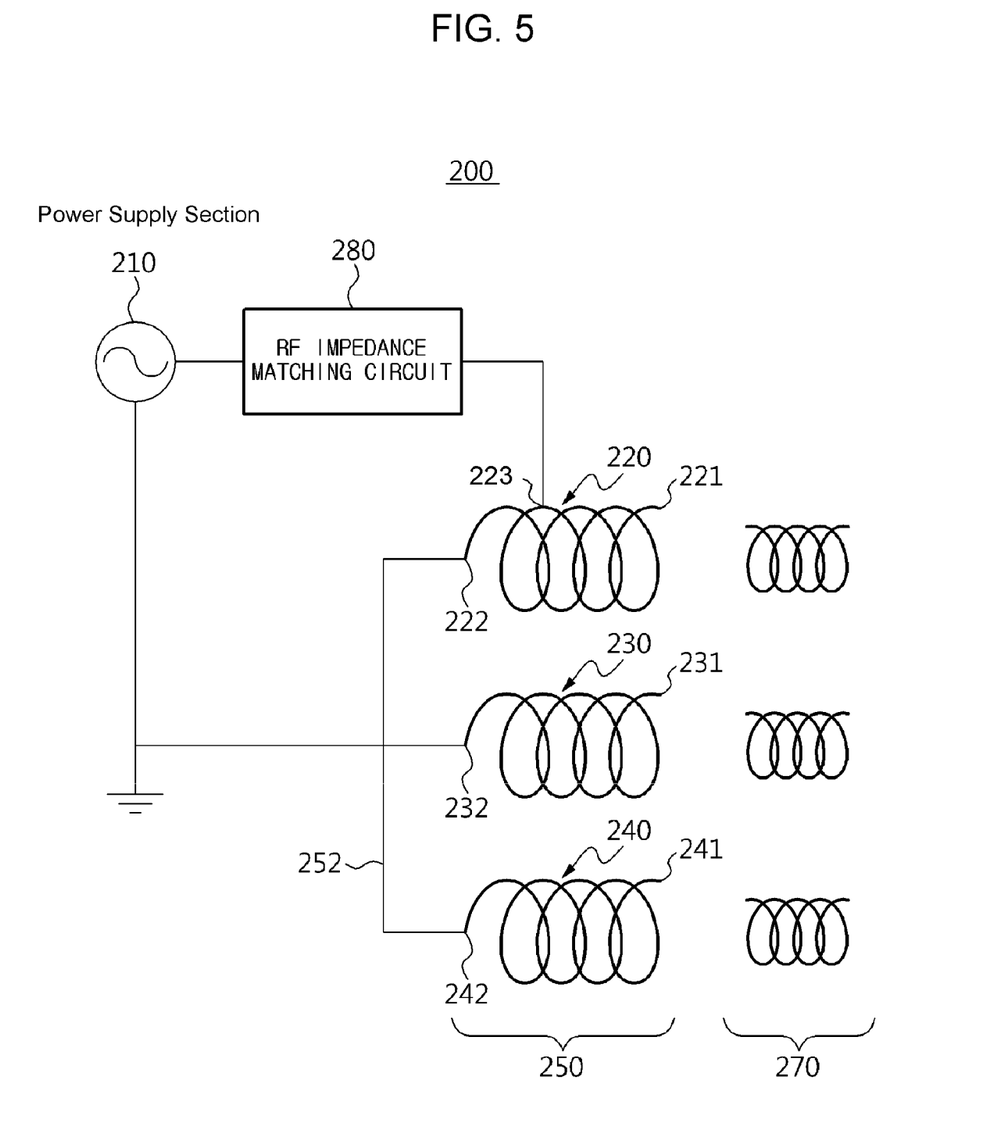
FIG. 5 shows a transforming example for a wireless power transmitting system according to an exemplary embodiment of the present invention.

FIG. 1 schematically shows a wireless power transmitting system according to a prior art, FIG. 2 shows the wireless power transmitting system and a transmitter according to an exemplary embodiment of the present invention, FIG. 3 shows the wireless power transmitting system and transmitter according to another embodiment of the present invention, FIG. 4 shows a transforming example for the transmitter for transmitting wireless power according to an exemplary embodiment of the present invention, and FIG. 5 shows a transforming example for a wireless power transmitting system according to an exemplary embodiment of the present invention.

Referring to FIG. 2, a wireless power transmitting system 100 according to an exemplary embodiment of the present invention includes a power supply section 110 for generating RF (Radio Frequency) power, a transmitter 150 receiving power generated from the power supply section 110, a receiver (refers to D in FIG. 1) wirelessly receiving the power by electromagnetic resonance with the transmitter 150, and a load end 170 for wirelessly receiving the power from the receiver by inductive coupling with the receiver.

The wireless power transmitting system 100 configured as above in an exemplary embodiment of the present invention wirelessly transfers or transmits the power by the electromagnetic resonance. Unlike a wireless power transmitting scheme using the electromagnetic resonance according to the prior art shown in FIG. 1, the wireless power transmitting system 100 in the present invention does not transmit the power by inductive coupling between the power supply section and transmitter, may wirelessly transmit the power by helical resonance of the transmitter, and may configure the transmitter as the multi-channel.

As shown in FIG. 2, the transmitter 150 of the wireless power transmitting system 100 in the present invention may include at least one helical type coils 120,130,140 for wirelessly transmitting the power by the helical resonance. That is, the transmitter 150 may be configured with a single or a plurality of helical type coils.

As shown in FIG. 2, when the transmitter 150 includes a plurality of helical type coils 120,130,140, it is possible to configure the transmitter 150 as the multi-channel. It is also desirable to configure the receiver, as the multi-channel, receiving the power from each channel, that is, each helical type coil on configuring the transmitter 150 as the multi-channel.

The transmitter 150 of the present invention includes helically wound coils 120,130,140 of a cylinder type having the same diameter as shown in FIG. 2, and spirally wound coils capable of gradually increasing or reducing the diameter on the same plane.

As shown in FIG. 3, the transmitter 150' of the wireless power transmitting system 100' in another embodiment of the present invention may include helically wound coils 120', 130', 140' on at least one plane for wirelessly transmitting the power by the helical resonance. That is, the transmitter 150' includes helically wound coils on a plurality of planes. As shown in FIG. 3, when the transmitter 150' includes spirally wound coils 120', 130', 140' on a plurality of planes, it is possible to configure the transmitter 150' as the multi-channel. Wherein, the load end 170' wirelessly receiving the power may be configured with spirally wound coils on the plane.

Other configurations except the coils configuring the transmitter 150' are the same as those of the wireless power transmitting system 100 shown in FIG. 2, and therefore a repetitive description is omitted.

At this time, a length of helically wound coils having the same diameter is the same as it of spirally wound coils that may increase or decrease the diameter thereof on the plane.

Although not shown in the drawings, the transmitter of the wireless power transmitting system in further another embodiment of the present invention includes spirally wound coils of a cone type that may increase or decrease a wound diameter thereof.

As described above, the transmitter 150 may be configured with a one helical type coil or a plurality of helical type coils, wherein, hereinafter, the transmitter 150 including a plurality of helical type coils is described, for example, to help understanding.

One ends 121,131,141 of a plurality of helical type coils 120,130,140 configuring the transmitter 150 are grounded and the other end 122,132,142 are in the air. As above, one ends of the helical type coils are grounded and the other ends are in a free-end state or not connected to anything, thereby to cause the helical resonance between the helical type coils and to send and receive electrical energy between the helical type coils by the helical resonance. In addition, driving frequencies necessary for wirelessly transferring the power from the transmitter to the receiver may be lowered to half level as compared with prior arts by including the transmitter 150 using the helical resonance between the helical type coils. Therefore, the driving frequencies, that is, resonant frequencies necessary for transferring the power are lowered to half level as compared with prior arts, thereby to reduce the power emitted into the air and to enhance the efficiency of the power transfer.

One ends 121,131,141 of a plurality of helical type coils 120,130,140 configuring the transmitter 150 are connected to a common line 152 and therefore may be grounded. At this time, the common line 152 connecting the grounded ends 121,131,141 may be flowed with weak current.

In order to generate the helical resonance between the helical type coils 120,130,140, it is desirable that the lengths of each of the helical type coils 120,130,140 are the same. The number of turn for a plurality of the helical type coils 120,130,140 may be differed from each other, but the lengths of them should be the same and therefore the electrical energy between the helical type coils may be sent and received from each other.

Wherein, the lengths of coils are the lengths on spreading the wound helical type coil into straight lines, and it means that the lengths between one end thereof and the other end thereof for a plurality of coils are the same on the assumption that one end thereof is a free-end and the other end thereof is grounded. At this time, a position of a tap 123 to be described later does not affect the lengths of the coils.

On the other hand, any one of a plurality of the helical type coils 120,130,140 is directly connected with the power supply section 110 for applying the power to the connected helical type coil 120. Referring to FIG. 2, the helical type coil 120 shown in the most left is directly connected with the power supply section 110, and the remaining 2 helical type coil 130, 140 is not directly connected with the power supply section 110. That is, the power supply section 110 is directly connected to one helical type coil 120 only of a plurality of the helical type coils 120,130,140 so as to apply the power to the transmitter 150.

The power supply section 110 connected to a tap 123 formed at a winding section of the helical type coil 120 may apply the power to any one helical type coil 120. The power supply section 110 applies AC power having frequencies corresponding to ¼ or an integral multiple thereof of each length of a plurality of the helical type coils 120,130,140 configuring the transmitter 150 to one helical coil 120 such that the helical resonance is generated between the helical type coils 120,130,140 and therefore the coils may send and receive the electrical energy from each other.

That is to say, when the power supply section 110 applies AC power having the same frequencies as those of ¼ or an integral multiple thereof of the length of the helical coil 120 to the helical type coil 120, the helical type coil 120 connected to the power supply section 110 is generated with the helical resonance. Thus, the remaining helical type coils 130,140, in which one ends of them are commonly grounded to the common line 152, are also generated with the helical resonance. Since the remaining coils have the same lengths as those of the helical type coil 120 connected to the power supply section 110, the helical resonance is generated in the remaining coils, and the remaining coils receive the electrical energy from the helical type coil 120 connected to the power supply section 110 and may store the received energy.

That is to say, the helical resonance used to the transmitter 150 of the wireless power transmitting system 100 in the present invention applies the power having the same frequencies as those of ¼ or an integral multiple thereof of each length of the helical type coils 120,130,140 to the helical type coil 120 directly connected to the power supply 110. Wherein, the helical resonance, which is a resonance phenomenon called cavity resonance, is generated between a plurality of the helical type coils 120,130,140. Hereinafter, the cavity resonance refers to the helical resonance for the convenience of the description.

Unlike this, when a plurality of the helical type coils 120,130,140 configuring the transmitter 150 stores the electrical energy by the helical resonance, the power to the electrical energy are wirelessly transferred or transmitted to the load end 170 by the magnetic resonance. That is, the helical type coils 130,140 that are not connected to the power supply section 110 among a plurality of the helical type coils 120,130,140 may receive the electrical energy from the helical type coil 120 connected to the power supply section 110 by the helical resonance of the helical type coil 120 connected to the power supply section 110.

The wireless power transmitting system 100 in an embodiment of the present invention may be infinitely disposed with the helical type coils commonly grounding one ends of them to one helical type coil 120 connected to the power supply section 110, thereby to simply and easily form the transmitter as the multi-channel. On forming the transmitter as the multi-channel, it is not necessary to dispose the power supply section for each the receiver or load end, thereby to reduce the cost required for manufacture of the system.

On the other hand, the wireless power transmitting method using the existing magnetic resonance separately needs a RF impedance matching circuit according to impedance at the load end, whereas the position of the tap 123 applying the power to the helical type coil 120 is controlled to autonomously implement the RF impedance matching circuit into the helical type coil 120 in the present invention. That is, the wireless power transmitting system 100 or transmitter 150 in an embodiment of the present invention does not separately need the impedance matching circuit.

FIG. 4 shows a transforming example for the helical type coil 120, autonomously having a RF impedance matching circuit, included in the transmitter 150. The helical type coil 120 autonomously has an autotransformer type according to the position of the tap 123 of the helical type coil 120, and therefore the impedance Z seen from the power supply section 100 is expressed as the following [Equation 1].

$$Z = \left(\frac{N_1}{N_2}\right)^2 Z_L \qquad \text{[Equation 1]}$$

In [Equation 1], N1 is the number of the turn for the coil having the tap 123, N2 is the number of the turn for the entire coil, and ZL is the impedance at the load end 170. In FIG. 3, N1 is the number of the turn from the grounded one end 121 to the tap 123 in the helical type coil 120, and N2 is the number of the turn from the grounded one end 121 to the other end 122 in the air in the helical type coil 120.

In [Equation 1], the impedance Z seen from the power supply section 110 is the square, of the ratio of the number of the turn for the helical type coil 120 having the tap 123 to the number of the entire turn for the helical type coil 120 having the tap 123, multiplied by the impedance ZL at the load end.

Further, in [Equation 1], the number N1 of the turn for the helical type coil 120 having the tap 123 is varied by varying the position of the tap 123 to control the impedance seen from the power supply section. Thus, the impedance seen from the power supply section may be easily controlled such that impedance matching between a transmission side and receipt side is performed by varying the position of the tap. The wireless power transmitting system 100 in one embodiment of the present invention may autonomously form the RF impedance matching circuit into the helical type coil 120 after varying the position of the tap 123 connected with the power supply section 110 without separately forming the impedance matching circuit.

When reactance component is present in the impedance ZL at the load end, it is possible to match the impedance by connecting a passive element 160 such as a trimming capacitor or an inductor to the helical type coil 120 in parallel with the power supply section 110 and compensating it. The passive element 160 such as the trimming capacitor or inductor may be connected to the winding section 124 of the helical type coil 120 similarly to the connection for the power supply section 110. Such a way may perform the impedance matching without separately forming the impedance matching circuit.

As described above, the transmitter 150 for transmitting wireless power, used in the wireless power transmitting system 100 in one embodiment of the present invention, includes the helical type coils 120,130,140 having one end at the grounded state and the other end in the air, respectively, and the helical type coil may wirelessly transmit the power by the helical resonance.

The power having the same frequencies as those of ¼ or an integral multiple thereof of each length of the helical type coils 120,130,140 is applied to one helical type coil 120 directly connected to the power supply section 110 such that the helical resonance is generated between a plurality of helical type coils 120,130,140, thereby to wirelessly transmit the power, to have simple structure and to operate with low frequencies by using the transmitter 150 for transmitting wireless power, to enhance the efficiency of the power transfer, and to reduce the cost for system building.

Further, the transmitter 150 includes a plurality of helical type coils 120,130,140 such that a transmission section may easily have multi-channel and therefore it is possible to wirelessly transmit the power in various ways.

On the other hand, on wirelessly transmitting the power by using the magnetic resonance, when the driving frequencies are large, the power to be emitted to the air is increased, thereby to lower the efficiency of the power transmission. However, the wireless power transmitting system 100 and the transmitter 150 for transmitting wireless power in an embodiment of the present invention uses the helical resonance between the helical type coils 120,130,140, thereby to lower the driving frequencies up to about half thereof and to enhance the efficiency of the power transmission.

Further, since the lower the driving frequencies, the reducer the manufacturing cost of the system, it is important to lower the driving frequencies. The wireless power transmitting system 100 in an embodiment of the present invention may contain material such as ferrite core, etc. to control or lower the resonance frequencies of the transmitter 150. The helical type coils 120,130,140 may contain the ferrite core to vary the resonance frequencies.

As shown in FIG. 5, the wireless power transmitting system 200 and the transmitter 250 for transmitting wireless power in an embodiment of the present invention may implement transmitting coils having multi-channel by connecting one ends 222,232,242 of a plurality of helical type coils 120,130,140 to a common line or a wire 252. The number of a receiver or load end 270 may be the same as it of channels for the transmitter 250.

The other ends 221,231,241, that are not grounded, is in a state floated in the air, and the tap 223 formed at the helical type coil 220 may be connected with the power supply section 210.

On the other hand, the transmitter 250 or helical type coil 220 may autonomously match the RF impedance by the tap 223, and the wireless power transmitting system 200 further include the RF impedance matching circuit 280 connected to the transmitter 250 or helical type coil 220.

In order to experiment the performance for the wireless power transmitting system in the present invention, the present applicant has experimented to turn on a waste fluorescent lamp using the helical resonance of the wireless power transmitting system according to an embodiment of the present invention. The helical type coils store a lot of electrical energy on performing the helical resonance such that plasma is generated in the waste fluorescent lamp by strong electrical field emitted from the helical type coil on bringing the waste fluorescent lamp into the peripheral section thereof and therefore the waste fluorescent lamp is turned on. It is apparent that the helical type coil generates the resonance at this experiment. In addition, it is possible to easily generate a light source without an electrode on using this method, and useless products such as the waste fluorescent lamp may be recycled.

Further, the present applicant has experimented with the wireless power transmission using the wireless power transmitting system in an embodiment of the present invention. On applying the RF power to the helical type coil for transmission and wirelessly receiving the power from the helical type coil for receipt to be spaced apart from the helical type coil for transmission, he checked that the waste fluorescent lamp near the helical type coil for receipt is turned on. On reviewing this experiment, we know that it is also possible to wirelessly transmit the power by the helical resonance of the helical type coil.

Further, he has experimented with the wireless power transmission using the transmitter, with the multi-channel, including a plurality of helical type coils. The tap for applying the power is made at the helical type coil for power supply, and the other 2 helical type coils for receipt is configured with the transmitter for transmitting wireless power, with the multi-channel, connecting one ends of the coils by the wire. He checked that each helical type coil generates the helical resonance by the driving frequencies of the power supply section and therefore the waste fluorescent lamp near the helical type coil for receipt is turned on. Thus, it may check that each helical type coil acts as one transmitter for transmitting wireless power.

The wireless power transmitting system in an embodiment of the present invention described above may match the impedance by varying the frequencies of power supply even when the transmitting frequencies are little by little varied according to the distance or coupling degree between the transmission and receipt. For example, on setting the resonance frequencies used for transmitting the wireless power as 1 MHz and performing the wireless power transmission using resonance coils at the transmission section and the receipt section corresponding to it, the distance become short and therefore the resonance frequencies may be smaller than 1 MHz. In this case, it is possible to match the impedance by changing the frequencies of the power supply into varied frequencies.

The transmitter for transmitting the wireless power in an embodiment of the present invention and the wireless power transmitting system having the same may be applied to a wireless charging network for an electrical vehicle or electrical transportation equipment, and may be also applied to the field for forming the light source without the electrode. Further, they may be also applied to the building of power network for wirelessly supplying the power to a transportation means using a motor on the road and on the tracks.

As described up to date, the present invention may implement the transmitting section with the multi-channel at the wireless power transmitting scheme using the magnetic resonance. The present invention increases the efficiency of the power transfer by simple structure and low frequencies as compared with the existing method, and may save the cost of the system building. In order to efficiently use the wireless power transmitting scheme using the magnetic resonance, the receiving section with the multi-channel should be implemented to one power supply section. The multi-channel is not implemented in the existing scheme, but it is possible to easily implement the transmitting section with the multi-channel in the present invention, thereby to use the wireless power transmitting in various ways.

The transmitter for transmitting the wireless power in an embodiment of the present invention includes the helical type coil, as described above, but may include the spiral type coil, thereby to acquire the same effect by the same configurations even in case of using the spiral type coil.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description. Therefore, the sprit of the present invention should not be limited to the above-described embodiments, and the following claims as well as all modified equally or equivalently to the claims are intended to fall within the scope and spirit of the invention.

INDUSTRIAL APPLICABILITY

The present invention may be applied to all industrial fields for necessitating the wireless power transmitting.

The invention claimed is:

1. A transmitter for transmitting wireless power, comprising:
   a plurality of coils formed in a form of helical, spiral, or conical type coils in which one ends thereof are connected to a common line in a grounded state and the other ends are not connected to the common line and provided in a free floating contactless state in the air,
   wherein one of the plurality of coils is directly connected to a power supply section for supplying AC power having a frequency equal to ¼ of the length of the coil or AC power having a frequency equal to an integral multiple of ¼ of the length of the coil, and the remaining coils are not directly connected to the power supply section,
   wherein a helical resonance occurs in the coil directly connected to the power supply section,
   wherein the remaining coils commonly grounded by the common line have the same length as the length of the coil directly connected to the power supply section, thereby generating the helical resonance and wirelessly transmitting the power by the helical resonance.

2. The transmitter for transmitting wireless power according to claim 1, wherein the coils that are not connected to the power supply section among the plurality of the coils receive electrical energy from the coil directly connected to the power supply section by the helical resonance of the coil directly connected to the power supply section.

3. The transmitter for transmitting wireless power according to claim 2, wherein a tap, that is connected to the power supply section and applies the power to the coil that directly connected to the power supply section, is formed at the winding portion of the coil, and an impedance seen from the power supply section is changed according to the position of the tap.

4. The transmitter for transmitting wireless power according to claim 3, wherein
   the coil directly connected to the power supply section autonomously has an autotransformer type according to the position of the tap, and
   the impedance Z seen from the power supply section is expressed as the following equation;

$$Z = \left(\frac{N_1}{N_2}\right)^2 Z_L$$

in the above equation, N1 is the number of turns from the grounded end of the coil connected to the common line to the tap, N2 is the number of turns from the grounded end of the coil to the other end of the coil in the free floating contactless state in the air, and $Z_L$ is an impedance at a load end.

5. The transmitter for transmitting wireless power according to claim 3, wherein a trimming capacitor or an inductor on the coil is connected in parallel with the power supply section.

6. The transmitter for transmitting wireless power according to claim 3, wherein an impedance matching between the transmitter and receipt side is performed by varying the position of the tap.

7. The transmitter for transmitting wireless power according to claim 6, wherein the plurality of coils have a different number of turns and the same lengths.

\* \* \* \* \*